Jan. 30, 1962 R. A. MacMILLAN 3,019,390
PHASE MEASURING SYSTEM
Filed May 5, 1959 2 Sheets-Sheet 2
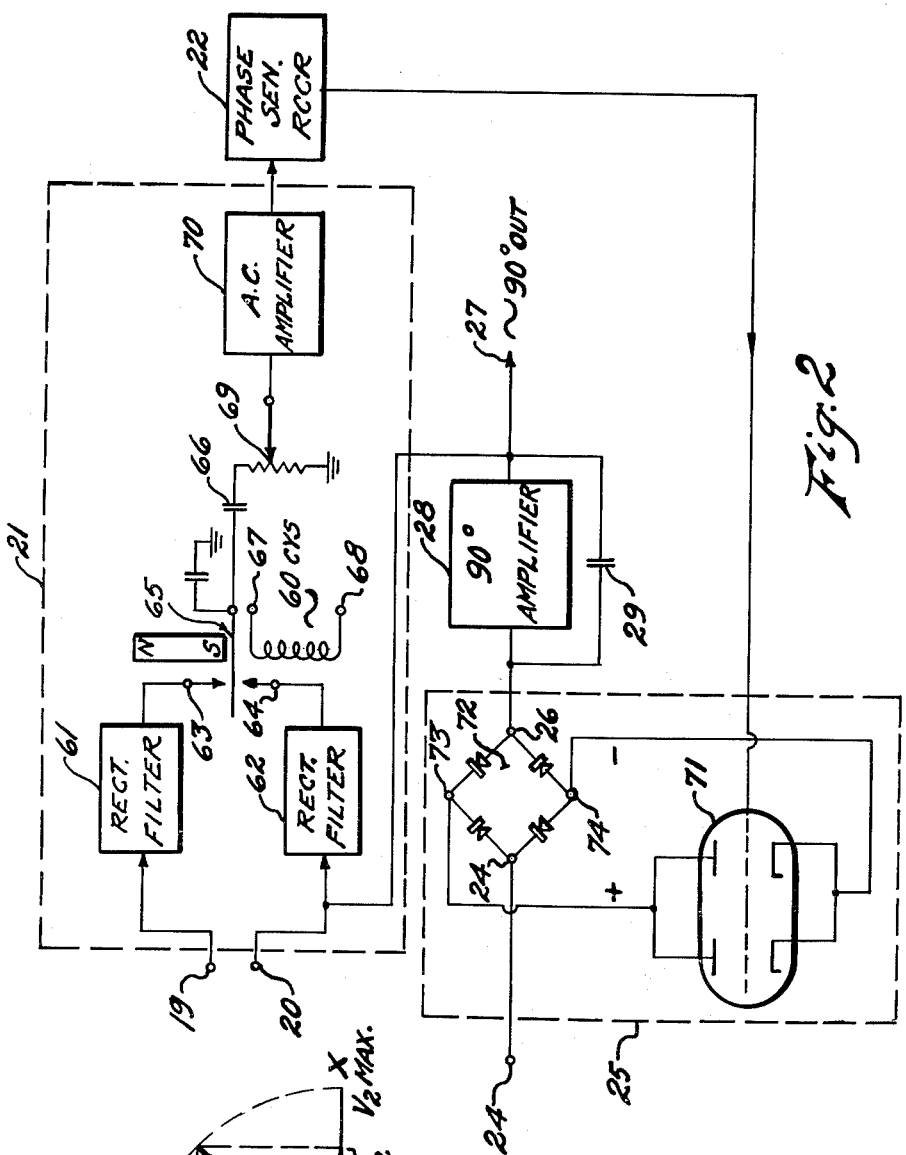
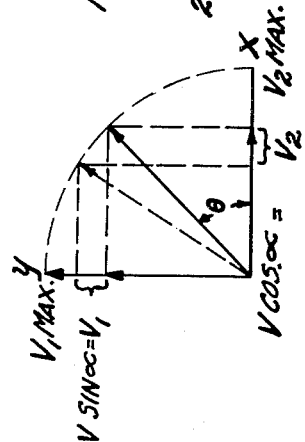
INVENTOR.
RAYMOND A. MACMILLAN
BY Wade County
George Fine
ATTORNEYS United States Patent Office 3,019,390
Patented Jan. 30, 1962

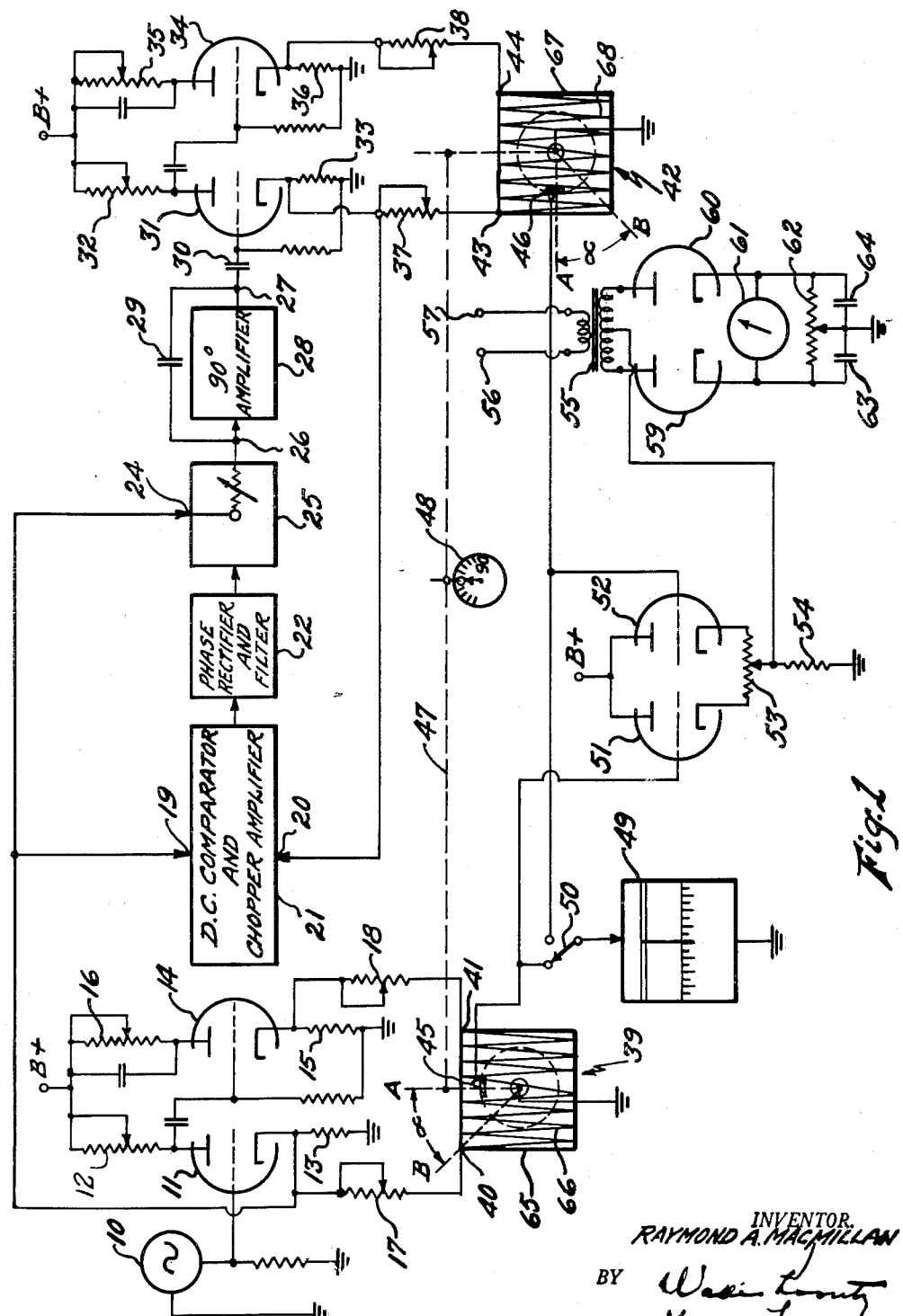

3,019,390
PHASE MEASURING SYSTEM
Raymond A. MacMillan, Greenwood, Mass., assignor to the United States of America as represented by the Secretary of the Air Force
Filed May 5, 1959, Ser. No. 811,236
4 Claims. (Cl. 324—83)
(Granted under Title 35, U.S. Code (1952), sec. 266)

The invention described herein may be manufactured and used by or for the United States Government for governmental purposes without payment to me of any royalty thereon.

This invention relates to a phase measuring system and more particularly to a phase system operating over a wide range of frequencies to precisely measure and indicate the phase of an unknown signal which may vary from 0° to 360° in phase.

An object of the present invention is to provide a novel phase measuring system including a reference signal whose amplitude is precisely constant and which is smoothly and continuously variable in phase from 0° to 360°.

Another object of the present invention is to provide a novel phase measuring system operating over a wide frequency range and including a reference signal whose phase is precisely known from 0° to 360° while the magnitude thereof remains absolutely constant.

Still another object of the present invention is to provide a phase measuring system operating over a wide frequency range and including a reference signal of precisely constant amplitude over a smooth and continuous phase shift of 360°.

Yet another object of the present invention is to provide a novel phase measuring system including a reference signal variable from 0° to 360° in phase utilized as a standard for comparison against a signal of unknown phase.

A further object of the present invention is to provide a novel phase measuring system including a continuously variable reference signal of constant amplitude utilized as a standard for a null type of comparison against a signal of unknown phase.

A still further object of the present invention is to provide a novel phase measuring system having a reference signal utilized as a standard whose phase is smoothly and continuously variable from 0° to 360° while its magnitude remains precisely constant and operating in combination with a novel comparison means including a null type of balancing of the aforesaid signal against the signal of unknown phase thereby permitting the unknown phase to be visually indicated by reference to aforesaid standard.

Other desirable objects and features of the invention, and the manner in which they are realized, will be apparent from the following detailed description of one embodiment of the invention, when considered in connection with the drawings, in which:

FIGURE 1 shows a diagram of the preferred embodiment of the present invention which is partly in block and partly in schematic;

FIGURE 2 shows a diagram partly in block and partly in schematic incorporated in the present invention and utilized for controlling an amplifier to produce unity gain thereof while maintaining a precise 90° phase of the output signal in relation to the input signal as the frequency of the input signal varies over a wide range; and FIGURE 3 shows the vector relationships produced by the sine and cosine potentiometers incorporated in the aforementioned preferred embodiment of the present invention.

Now referring in detail to FIGURE 1, there is shown a system for measuring the phase of an unknown signal in which signal source 10 supplies an A.C. sinusoidal voltage having a phase of 0°. This sinusoidal signal may vary over a wide range of frequencies. The source voltage is fed to phase splitter circuit 11. Phase splitter circuit 11 is one in which the input source voltage is applied to the grid of the triode incorporated therein and thereby producing an A.C. sinusoidal voltage having a 180° phase shift at adjustable anode load resistor 12 and 0° phase shift at cathode resistor 13. The 180° phase shifted voltage is applied to the grid of the triode incorporated in cathode follower 14. The sinusoidal voltage having a 180° phase then appears at cathode resistor 15. The two A.C. sinusoidal voltages appearing at cathode resistors 13 and 15, having a phase of 0° and 180° respectively, are made precisely equal to each other in amplitude and to the source voltage by varying adjustable anode resistor 12. A D.C. potential appears at each cathode resistors 13 and 15 respectively, and are made equal to each other by varying adjustable anode resistor 16. Large values of resistance and capacitance are used in the coupling circuits to ensure accuracies in phase relationships of input and output voltages. The A.C. and D.C. voltages from cathode resistor 13 are applied to terminal 40 of sine potentiometer 39 by way of rheostat 17. The A.C. and D.C. voltages from cathode resistor 15 are applied to terminal 41 of sine potentiometer 39 by way of rheostat 18. The center of sine potentiometer 39 is grounded.

The A.C. voltage having a 0° phase shift obtained from the cathode of phase-splitter 11 is also applied to point 19 of D.C. comparator and chopper amplifier 21 and to point 24 of A.C. variable resistance 25 and therethrough to amplifier 28. Amplifier 28 is provided with feedback capacitor 29 connecting output terminal 27 to input terminal 26. Initially, A.C. variable resistance 25 is made equal in value to the value of the capacitive reactance of capacitor 29 in the presence of a fixed frequency input voltage applied at point 24. This can be accomplished by first adjusting the value of variable resistance 25 so that the A.C. input voltage at point 24 is equal in amplitude to the A.C. output voltage at point 27. When the value of variable resistance 25 is made equal to the value of capacitive reactance of feedback capacitor 29 for any specific input frequency, the over-all gain, G, is unity and the phase angle of the output voltage from amplifier 28 is 90° with an error of $1/A$ radians where A is the open loop gain. Conversely, when the input voltage to variable resistance 25 is made to equal the output voltage of amplifier 28 for any specific input frequency, by adjusting variable resistance 25, the gain is equal to unity, and the value of variable resistance 25 is equal to the value of the capacitive reactance of capacitor 29. The resulting phase angle of the output voltage at point 27 is 90°. For example, with an amplifier voltage gain of 4000, the output voltage will have a 90° phase angle within an error of 0.01432°; 1 radian=57.3° or $\frac{1}{4000}$ radian =0.01432°.

It is to be noted that the aforementioned mode of operation wherein the value of capacitive reactance of capacitor 29 is made equal to that of A.C. variable resistance 25 is accomplished for only one specific input frequency. However, it is required that this equality be maintained over a wide range of frequencies. Since the capacitive reactance of capacitor 29 changes with frequency, an automatic and continuous control of A.C. variable resistance 25 is provided so that the value of capacitive reactance of capacitor 29 is always maintained equal to that of A.C. variable resistance 25 regardless of the frequency variations of the input voltage.

The automatic and continuous retention of a precise 90° phase shift and unity gain regardless of frequency variation is provided by way of amplifier 23. The A.C. voltage, for a specific frequency, having a precise 0° phase is applied to point 19 of D.C. comparator and chopper amplifier 21 and to point 24 of variable resistance 25 by way of the cathode of phase-splitter 11. An A.C. voltage having a precise 90° phase for the aforesaid specific frequency is fed to point 20 of D.C. comparator and chopper amplifier 21 by way of the cathode of phase-splitter 31. The A.C. voltages at points 19 and 20 are precisely equal in amplitude. D.C. comparator and chopper amplifier 21 first rectifies and filters the two A.C. input voltages and produces two D.C. voltages representative of the two A.C. input voltages. The two D.C. voltages are compared to each other and if the potentials are unequal because of frequency variations of the source signal, an output voltage is provided which is chopped into a representative A.C. voltage which is then amplified. Phase rectifier-filter 22 accepts the amplified A.C. voltage and produces a filtered D.C. voltage serving as a control voltage for variable resistance 25. Variable resistance 25 will vary its A.C. resistance in response to and in accordance with the magnitude of the aforementioned control voltage.

The automatic and continuous retention of a precise 90° phase shift and unity gain regardless of frequency variation is provided by way of amplifier 28. The A.C. voltage, for a specific frequency, having a precise 0° phase is applied to point 19 of D.C. comparator and chopper amplifier 21 and to point 24 of variable resistance 25 by way of the cathode of phase-splitter, cathode follower 11. An A.C. voltage having a precise 90° phase for the aforesaid specific frequency is fed to point 20 of D.C. comparator and chopper amplifier 21 by way of the cathode of phase-splitter, cathode follower 31. The A.C. voltages at points 19 and 20 are precisely equal in amplitude. D.C. comparator and chopper amplifier 21 first rectifies and filters the two A.C. input voltages and produces two D.C. voltages representative of the two A.C. input voltages. The two D.C. voltages are compared to each other and if the potentials are unequal because of frequency variations of the source signal, an output voltage is provided which is chopped into a representative A.C. voltage which is then amplified. Phase rectifier-filter 22 accepts the amplified A.C. voltage and produces a filtered D.C. voltage serving as a control voltage for variable resistance 25. Variable resistance 25 will vary its A.C. resistance in response to and in accordance with the magnitude of the aforementioned control voltage. Thus, variable resistance 25 will have its A.C. resistive magnitude automatically and continuously controlled so that regardless of the variations of the value of capacitive reactance of capacitor 29, in response to frequency variation, the value of variable resistance 25 will always be equal to the value of capacitive reactance of capacitor 29.

The mode of operation to provide an automatic and continuous control of amplifier 28 is described in greater detail by referring to FIGURE 2, wherein the two voltages applied to points 19 and 20 of D.C. comparator and chopper amplifier 21 of FIGURE 1 is shown as applied to inputs 19 and 20 of FIGURE 2. Initially, for a specific frequency, the input voltage applied to input 19 has 0° phase and the one applied to input 20 has 90° phase. The input voltages are precisely equal in amplitude. Rectifier-filter 61 provides a D.C. voltage to point 63 of vibrator 65 and rectifier-filter 62 provides a D.C. voltage to point 64. If the potentials are equal at points 63 and 64, no change in the charge of coupling capacitor 66 occurs, as the vibrator arm contacts each circuit; therefore no A.C. voltage appears at the input of A.C. amplifier 70. However, when the frequency of the source signal varies, the potential at point 64 is more or less than the potential at point 63, the difference becomes "chopped" and an alternating voltage appears by way of potentiometer 69 at the input of amplifier 70. The amplitude thereof is proportional to the difference of the D.C. potentials at points 63 and 64. The phase of this voltage relative to the phase of energizing voltage for vibrator 65 has one of two possible values, 0° or 180°. The phase of the vibrator drive voltage applied to terminals 67 and 68 is so chosen that the D.C. potential produced by phase-sensitive rectifier 22 is negative when the D.C. potential at point 64 is less than at point 63.

The filtered D.C. voltage produced by phase-sensitive rectifier 22 is applied to variable resistance 25 by the way of the control grid of twin triode 71, the two halves being connected in parallel. Crystal-bridge rectifier 72 is connected to the anodes of triode 71 by way of point 73 and to the cathodes by way of point 74. The A.C. input voltage to be controlled by variable resistance 25 is applied to point 24 of bridge rectifier 72 and the A.C. output voltage is produced at point 26. Twin-triode 71 in combination with crystal bridge rectifier 72 provides a control circuit for alternating voltage and/or current. The apparent resistance of the bridge rectifier can be varied from megohms, when the tube is cut off, to a few hundred ohms when the tube is conducting fully. The A.C. voltage fed into point 24 of bridge rectifier 72 is presented with an A.C. resistance whose magnitude varies in response to and in accordance with the D.C. control voltage applied to the control grid of tube 71.

A more detailed description of the mode of operation of the bridge rectifier 72 and associated control tube 71 is given in my copending patent application entitled "Variable A.C. Transducer" filed at even date herewith and bearing Serial No. 811,237. The A.C. output voltage from point 26 of variable resistor 25 is applied to amplifier 28. There is thus provided a system to automatically and continuously control an amplifier so that an A.C. output voltage results which is always precisely equal in amplitude to the A.C. input voltage regardless of frequency variation and always produces a precise 90° phase shift relative to the input voltage.

A more detailed description of the mode of operation of the above-mentioned system for controlling amplifier 28 is given in my copending patent application entitled "Automatic Phase Stabilizer System" filed even date herewith and bearing the Serial No. 811,238.

Referring again to FIGURE 1, the A.C. sinusoidal output voltage from amplifier 28 measured at point 27 is precisely equal in amplitude to that of the input voltage at point 24 of variable resistance 25 and has a precise phase of 90° relative to aforesaid input voltage. The A.C. sinusoidal voltage with a phase of 90° is applied to the grid of the triode incorporated in phase splitter circuit 31 thereby producing an A.C. sinusoidal voltage with a phase of 270° at adjustable anode resistor 32. An A.C. sinusoidal voltage having a 90° phase also appears at cathode resistor 33. The sinusoidal voltage with a phase of 270° appearing at anode resistor 32 is applied to the grid of a triode which is incorporated in cathode follower 34 and as a result thereof a sinusoidal voltage having a phase of 270° appears at cathode resistor 36. The sinusoidal voltage at cathode resistor 33 is made equal in amplitude to sinusoidal voltage at cathode resistor 36 by means of adjusting variable anode resistor 32. The aforesaid sinusoidal voltages are also equal in amplitude to the one impressed upon phase splitter 31. A D.C. potential also appears at each of cathode resistors 33 and 36 respectively, and are made equal to each other in amplitude by varying adjustable resistor 35. The A.C. and D.C. voltages from cathode resistor 33 are applied to terminal 43 of cosine potentiometer 42 by way of rheostat 37. The A.C. and D.C. voltages from cathode resistor 36 are applied to terminal 44 of cosine potentiometer 42 by way of rheostat 38. The center of cosine potentiometer 42 is grounded.

A sinusoidal voltage is available from each of cathode resistors 13, 15, 33 and 36. They are equal to each other precisely in amplitude but their phases are 0°, 180°, 90° and 270° respectively. There is also available from each of cathode resistors 13, 15, 33 and 36 a D.C. voltage, each of which is equal in amplitude to the others. The amplitudes and phases of aforesaid voltages are maintained constant regardless of the variation of frequency of the source signal.

In FIGURE 1, sine potentiometer 39 is comprised of insulating card 65 upon which is wound wire resistance 66. Brush contact 45 moves in a circle and is rotated by common drive shaft 47. Cosine potentiometer 42 is comprised of insulating card 67 upon which is wound wire resistance 68. Brush contact 46 is displaced 90° from brush contact 45 and is rotated in unison with brush contact 45 as it is rotated by common drive shaft 47.

The sinusoidal voltages from cathode resistors 13, 15, 33, and 36 are hereafter designated as $E_1$, $E_2$, $E_3$ and $E_4$ respectively. The two sinusoidal, $E_1$ and $E_2$, having equal amplitudes but 180° phase difference, are applied to sine potentiometer 39 by way of rheostats 17 and 18 respectively. One voltage appears across each half of the resistance winding of potentiometer 39. The center of the resistance being a common path via the chassis ground. The two sinusoidal voltages, $E_3$ and $E_4$, with equal amplitudes, and equal in amplitude to $E_1$ and $E_2$ but having a phase difference of 90° and 270° in respect to $E_1$ are applied to each half of cosine potentiometer 42. Contact brush 45 of sine potentiometer 39 is connected to contact brush 46 of cosine potentiometer 42 mechanically by means of common drive shaft 47 which rotates aforesaid brushes in unison. Mounted on common drive shaft 47 is dial 48 which is calibrated from 0° to 360°. Contact brush 46 is mechanically displaced 90° in respect to contact brush 45.

The alternating voltage which appears between brush 45 and ground is the result of the brush position and the current which flows in that half of sine potentiometer 39 due to $E_1$ when brush 45 is moved from position A to position B. As brush 45 is rotated, the amplitude of the voltage at brush 45 varies as the sine of the angle $\alpha$. The phase angle of this voltage in respect to $E_1$ is either 0° or 180°, depending on which half of the potentiometer resistance is contacted by brush 45. For the position shown in B, the phase angle is 0°.

In like manner, the voltage at brush 46 of cosine potentiometer 42 varies in amplitude as the cosine of the angle $\alpha$, since brush 46 is mechanically positioned 90° from brush 45, and both brushes are rotated in unison. The voltage at brush 46 can have one of two possible phases, 90° or 270°. For position B, it is 90°.

Referring to FIGURE 3, for a change in mechanical angle $\alpha$ from 0° to 90°, the amplitude of the voltage out, $V_1$, from sine potentiometer 39 will be $V_1 \sin \alpha$, and the amplitude of the voltage out, $V_2$, from cosine potentiometer 42 will be $V_2 \cosine \alpha$ and $V_1$ max.$=V_2$ max. However, an angle of $\alpha$ chosen so that $V_1$ is maximum causes $V_2$ to be zero and vice versa.

There are available two voltages, one from sine potentiometer 39 and the other from cosine potentiometer 42. They have a phase difference of 90, with amplitudes proportional to the sine and cosine of the mechanical angle of brush-shaft rotation. These two voltages are to be summed subsequently in a vectorial fashion. The resulting voltage represented by C and produced by summing the two vectors is constant in amplitude for any angle of $\alpha$ and will have an electrical phase angle which can vary from 0° to 90° in reference to $V_1$, depending on the position of the mechanical angle $\alpha$.

The voltage which appears between the brush of the sine potentiometer and ground has an amplitude which is proportional to the sine of the angle of rotation. In a similar manner, the cosine voltage which appears between the brush of the cosine potentiometer and ground has an amplitude which is proportional to the cosine of the angle of rotation. FIGURE 3 shows that a sinusoidal voltage with amplitude values which vary from 0 to 1.0 as a sine function combined with a cosine voltage with amplitude values varying from 1.0 to 0, as a cosine function, yields a resultant or vector voltage of phase angle corresponding to the sine-cosine amplitudes of the respective voltages and of constant amplitude for any phase angle over 90°. By selecting the proper phase quadrant of the combining voltages, this vector addition is extended through 360°. Therefore as the common drive shaft is rotated and the output voltages from the sine and cosine potentiometers are vectorially added during aforesaid rotation, there is produced a resulting voltage which smoothly, simply and continuously is shifted from 0° to 360° while maintaining a precisely constant amplitude. The degree of phase shift is precisely indicated by the aforesaid calibrated dial.

Again referring to FIGURE 1, there is also provided by way of cathode resistor 13 a D.C. voltage, $E_5$, equal in amplitude to a D.C. voltage, $E_6$, from cathode resistor 15. The alternating voltages $E_1$ and $E_2$ plus the two D.C. voltages, $E_5$ and $E_6$, are applied to sine potentiometer 39 through rheostats 17 and 18 respectively. The center of sine potentiometer being grounded, the voltages are thereby referred to ground. The D.C. current flowing in either half of the sine potentiometer resistance produces a voltage at brush 45 which is proportional to the sine of the angle of rotation of the brush around the center of the sine potentiometer resistance. This voltage is accurately measured and indicated by D.C. potentiometer 49, and can be adjusted in small increments by rheostats 17 and 18; therefore, the reading of the D.C. potentiometer 49 can represent any value in the sine table to 0.1° or better.

Since the amplitude of $E_1$ and $E_2$, having phases 0° and 180° respectively, at brush 45 are the result of the same IR drop in the common resistance of sine potentiometer 39, the D.C. and A.C. voltages have a constant and exact relationship to each other for any brush position. Hence, measurement of the D.C. voltage may be interpreted in terms of the A.C. voltage. It is to be noted that the two A.C. maximum amplitudes at brush 45 are made equal and are stable, the same being true for the D.C. voltages.

The A.C. voltages $E_3$ and $E_4$, having 90° and 270° phase, plus D.C. voltage, $E_7$, and D.C. voltage, $E_8$, from cathode resistors 33 and 36 are applied to cosine potentiometer 42 by way of rheostats 37 and 38 respectively and operate in an identical manner as recited for sine potentiometer 39 except for the 90° displacement in brush position to obtain a cosine relationship. By means of selector switch 50, the amplitudes of the two A.C. voltages which are to be added vectorily can be measured and/or adjusted accurately.

The vector voltage from brush 45 of sine potentiometer 39 is applied to the control grid of triode 51 and the vector voltage from brush 46 of cosine potentiometer 42 is applied to the control grid of triode 52. Triodes 51 and 52 are adjusted for equal response by potentiometer 53. Vector addition is accomplished in common cathode resistor 54 without error. The resulting voltage therefrom is applied to the center top of the secondary winding of transformer 55. The primary winding of transformer 55 has applied thereto by way of terminals 56 and 57 a voltage of unknown phase. The anode of diode 59 is connected to one end of secondary winding of transformer 55 and the anode of diode 60 is connected to the other end. The respective cathodes of diodes 59 and 60 are interconnected by means of voltmeter 61 and potentiometer 62, the center top of which is grounded. Voltmeter 61 has a scale of 50–0–50 to permit a null reading. The cathode of diode 59 is filtered to ground by capacitor 63 and the cathode of diode 60 by capacitor 64. The current flows in diodes 59 and 60 are equalized by adjustment of potentiometer 62.

When the voltage of unknown phase is applied to terminals 56 and 57, common drive shaft 47 is rotated until there is a null indication in voltmeter 61. The unknown phase is then precisely determined. It is to be noted calibration dial 48 indicates the phase angle. It is also possible to obtain the unknown phase by the readings from D.C. potentiometer 49.

While in accordance with the provisions of the statutes, I have illustrated and described the best form of the invention now known to me, it will be apparent to those skilled in the art that changes may be made in the form of the system disclosed without departing from the spirit of the invention as set forth in the appended claims.

Having now described my invention, what I claim as new and desire to secure by Letters Patent is:

1. In a phase measuring system, a source of A.C. sinusoidal voltage with a wide frequency range having a 0° phase, means to convert said source voltage into a first pair of A.C. sinusoidal voltages of equal amplitudes, one voltage of said first pair having a precise 0° phase and the other a precise 180° phase, said first pair of A.C. voltages having superimposed thereupon a first pair of D.C. voltages of equal amplitudes, means to convert said voltage of 0° phase of said first pair of A.C. voltages into an A.C. sinusoidal voltage of precisely equal amplitude and having a precise 90° phase shift, means to automatically and continuously maintain precisely said amplitude and said phase shift of said 90° phase shifted voltage over said wide frequency range, means to convert said A.C. sinusoidal voltage having a 90° phase shift into a second pair of A.C. sinusoidal voltages of equal amplitude, one voltage of said second A.C. pair having a precise 90° phase and the other a precise 270° phase, said second pair of A.C. voltages having superimposed thereupon a second pair of D.C. voltages of equal amplitudes, a sine potentiometer having said first pairs of voltages applied thereto by way of a first pair of variable resistance means, said sine potentiometer including a first rotating brush, a cosine potentiometer having said second pairs of voltages applied thereto by way of a second pair of variable resistance means, said cosine potentiometer including a second rotating brush, a common drive shaft to rotate said first and second brushes in unison, said drive shaft having affixed thereto a calibrated dial, a D.C. potentiometer arranged to selectively measure the output D.C. voltage from said first brush or said second brush, means to vectorially sum the A.C. sinusoidal voltages from said first brush and said second brush to obtain a resulting voltage, and means to compare the phase of said resulting voltage to an A.C. voltage of unknown phase.

2. In a phase measuring system as defined in claim 1 wherein said phase comparison means is comprised of a transformer having a primary winding and a center tapped secondary winding, means to impress said A.C. voltage of unknown phase across said primary winding, means to impress said resulting voltage on said center tap of said secondary winding, a pair of diodes, each having an anode and cathode, means to impress said secondary winding across said anodes of said pair of diodes, a voltmeter impressed across said cathodes of said pair of diodes, and means to rotate said common drive shaft until said voltmeter indicates a null position.

3. In a phase measuring system, a source of A.C. sinusoidal voltage with a wide frequency range having a 0° phase, means to convert said source voltage into a first pair of A.C. sinusoidal voltages superimposed on a first pair of D.C. voltages and a second pair of A.C. sinusoidal voltages superimposed upon a second pair of D.C. voltages, each D.C. pair of voltages being precisely equal in amplitude to the other and each A.C. pair of voltages being equal in amplitude to the other, one of said first pair of A.C. voltages having a precise 0° phase and the other a precise 180° phase, one of said second pair of A.C. voltages having a precise 90° phase and the other a precise 270° phase, means to automatically maintain said amplitudes of said pairs of A.C. voltages and said phases constant over said wide frequency range, a sine potentiometer having said first pair of voltages applied thereto by way of a first pair of variable resistance means, said sine potentiometer including a first rotating brush, a cosine potentiometer having said second pairs of voltages applied thereto by way of a second pair of variable resistance means, said cosine potentiometer including a second rotating brush, a common drive shaft to rotate said first and second brush as in unison, said drive shaft including a calibrated dial, a D.C. potentiometer arranged to selectively measure the output D.C. voltage from said first or second brush, means to vectorially sum the A.C. sinusoidal voltages from said first brush and said second brush to obtain a resulting voltage, and means to compare the phase of said resulting voltage to an A.C. voltage of unknown phase.

4. In a phase measuring system as defined in claim 3 wherein said phase comparison means is comprised of a transformer having a primary winding and a center tapped secondary winding, means to impress said A.C. voltage of unknown phase across said primary winding, means to impress said resulting voltage on said center tap of said secondary winding, a pair of diodes, each having an anode and cathode, means to impress said secondary winding across said anodes of said pair of diodes, a voltmeter connected across said cathodes, and means to rotate said common drive shaft to obtain a null reading in said voltmeter.

References Cited in the file of this patent

UNITED STATES PATENTS

| | | |
|---|---|---|
| 2,469,155 | Bussey | May 3, 1949 |
| 2,471,105 | Gustafsson | May 24, 1949 |
| 2,481,492 | Bjarnason | Sept. 13, 1949 |
| 2,532,368 | Malmquist et al. | Dec. 5, 1950 |
| 2,548,855 | Bartelink | Apr. 17, 1951 |
| 2,659,050 | Honey | Nov. 10, 1953 |
| 2,685,063 | Alsberg | July 27, 1954 |
| 2,703,380 | Fraser | Mar. 1, 1955 |
| 2,855,566 | Sims et al. | Oct. 7, 1958 |
| 2,857,568 | Hering | Oct. 21, 1958 |
| 2,911,592 | Colker et al. | Nov. 3, 1959 |

FOREIGN PATENTS

| | | |
|---|---|---|
| 699,832 | Great Britain | Nov. 18, 1953 |